United States Patent
Bell et al.

(10) Patent No.: US 7,150,450 B2
(45) Date of Patent: Dec. 19, 2006

(54) VEHICLE SUSPENSION DAMPER WITH INTEGRAL HEIGHT LEVELING VALVE

(75) Inventors: Stephen Howard Bell, Guelph (CA); Darryl Sendrea, Brampton (CA)

(73) Assignee: ArvinMeritor Technology, LLC, Troy, MI (US)

( * ) Notice: Subject to any disclaimer, the term of this patent is extended or adjusted under 35 U.S.C. 154(b) by 48 days.

(21) Appl. No.: 10/453,966

(22) Filed: Jun. 4, 2003

(65) Prior Publication Data

US 2004/0245687 A1 Dec. 9, 2004

(51) Int. Cl.
*F16F 9/04* (2006.01)
*F16F 9/43* (2006.01)

(52) U.S. Cl. ................. 267/64.21; 267/64.28

(58) Field of Classification Search ............. 267/64.21, 267/64.11, 64.23, 64.28, 64.18; 188/289
See application file for complete search history.

(56) References Cited

U.S. PATENT DOCUMENTS

| | | | | |
|---|---|---|---|---|
| 1,664,510 A | * | 4/1928 | Hughes, Jr. ............. 280/6.158 |
| 2,735,634 A | * | 2/1956 | Fosness ................ 244/104 FP |
| 2,844,386 A | * | 7/1958 | Pribonic ................ 280/6.157 |
| 2,905,430 A | | 9/1959 | Deist |
| 2,906,526 A | * | 9/1959 | Bowser et al. ........... 267/64.21 |
| 2,947,530 A | * | 8/1960 | Charles ................... 267/64.16 |
| 2,985,445 A | * | 5/1961 | Bowser ................... 267/64.21 |
| 3,036,844 A | * | 5/1962 | Vogel ..................... 267/64.19 |
| 3,082,018 A | * | 3/1963 | Smirl ..................... 280/6.158 |
| 3,153,425 A | * | 10/1964 | Brueder ................... 137/596.2 |
| 3,178,167 A | * | 4/1965 | Loewis of Menar ..... 267/64.21 |
| 3,246,905 A | * | 4/1966 | Morgan ................... 280/6.159 |
| 3,572,676 A | * | 3/1971 | Yew ............................ 267/34 |
| 3,687,481 A | * | 8/1972 | Graef ..................... 280/6.159 |
| 3,689,053 A | * | 9/1972 | Wanner ................... 267/64.21 |
| 3,790,147 A | * | 2/1974 | Owen ..................... 267/64.21 |
| 4,325,541 A | * | 4/1982 | Korosladanyi et al. ..... 267/220 |
| 4,669,710 A | * | 6/1987 | Horvat ................... 267/64.21 |
| 5,386,975 A | * | 2/1995 | Wallis ..................... 267/119 |
| 5,649,692 A | | 7/1997 | Gilsdorf et al. |
| 5,707,045 A | | 1/1998 | Easter |
| 6,332,624 B1 | | 12/2001 | Gilsdorf et al. |
| 6,345,705 B1 | | 2/2002 | Tremblay |
| 6,402,128 B1 | * | 6/2002 | Trowbridge ............. 267/64.21 |
| 6,454,248 B1 | * | 9/2002 | Pradel ..................... 267/64.24 |

FOREIGN PATENT DOCUMENTS

DE  10 47 640 B  12/1958
EP  1 122 459 A  8/2001

OTHER PUBLICATIONS

European Search Report, dated Nov. 24, 2004.

* cited by examiner

*Primary Examiner*—Robert A. Siconolfi
(74) *Attorney, Agent, or Firm*—Carlson, Gaskey & Olds (57) ABSTRACT

An air spring suspension damper assembly includes a first housing and a second housing which telescope relative to each other. An actuating member such as a cable is connected to a height leveling valve contained in one of the housings and attached to the other housing. The actuating member moves a member such as a rotating cam, a rotating valve plate and/or a rotating valve such that changes in the suspension height rotate the member. Rotation of the member selectively opens inlet and exhaust flow paths to control the air pressure in the damper assembly and maintain air suspension height at a predetermined height.

15 Claims, 9 Drawing Sheets

VEHICLE SUSPENSION DAMPER WITH INTEGRAL HEIGHT LEVELING VALVE

BACKGROUND OF THE INVENTION

This invention relates to vehicle suspension dampers and more particularly to vehicle suspension dampers with a height leveling capability.

Pneumatic height leveling valves used in air suspension systems maintain a predetermined ride height by regulating the pressurized air within an air spring system. Conventional systems utilize an external height leveling valve to control the amount of air in and out of the air spring. Although effective, remote valves require additional packaging space within the vehicle. In addition, an external valve may be adversely affected by dirt and moisture as the valve may be relatively exposed to the environment.

Integral height leveling valves are becoming more widely known, but commonly provide a relatively complex piston and sleeve arrangement which envelops a vast majority of the damper body. A relatively thick piston and sleeve arrangement covers a large portion of the damper which may result in poor heat dissipation. Conventional internal height leveling valves also typically utilize a linear placement of the valve mechanism. Such a linear placement may introduce a significant amount of dead-length within the damper which may prohibit articulations of the damper under certain vehicle geometries.

Accordingly, it is desirable to provide a damper assembly with a compact integral height leveling valve which maximizes heat dissipation, and is cost effective.

SUMMARY OF THE INVENTION

The present invention provides a height leveling valve for use in a vehicle having an air spring suspension. The suspension is adjusted to a predetermined height such that the vehicle is relatively level. When the vehicle is in a loaded condition, the suspension falls out of the predetermined range and is not level. The height leveling valve brings the vehicle level once again by regulating fluid pressure within the suspension to return the suspension to the predetermined height.

The height leveling valve of the present invention may be incorporated into an air spring shock module or a shock absorber. In either case, a cylinder contains a piston, as generally known in the art. A piston rod extends from the cylinder into a first housing. A second housing surrounds the cylinder. An actuating member such as a cable is connected to the valve. The height leveling valve can be contained in either the first or the second housing. This compact arrangement aids in heat dissipation. The actuating member is attached to a rotating cam, a rotating valve plate or a rotating valve. Preferably, the actuating member winds around a spool that is connected to the cam, rotating valve plate or rotating valve such that changes in the unwound length of the actuating member rotates the cam, rotating valve plate or rotating valve in one direction or the other. In designs where a cam is used, the cam directly activates radial or axially located spring biased inlet and exhaust valves or else a sliding valve plate.

If a sliding valve plate is used it sits adjacent the rotating cam and includes an inlet and an exhaust flow path which can be aligned with a corresponding inlet or exhaust flow path through the port valves contained in the first or second housing. A return spring biases the valve plate toward the cam such that rotation of the cam displaces the valve plate to selectively open and close the inlet and exhaust flow paths.

If the actuating member activates a rotating valve plate then axially located port valves in the first or second housing contact the valve plate which contains inlet and exhaust flow paths.

If the actuating member activates a rotating valve then port valves located to a radial dimension about the rotating valve axis contact the rotating valve which contains inlet and exhaust flow paths. The inlet and exhaust flow paths are selectively opened and closed as the rotating valve plate or rotating valve is rotated under the control of the actuating member to align the inlet or exhaust flow paths through the port valves in the first or second housing with the corresponding inlet or exhaust flow path through the rotating valve plate or valve. Using fewer parts reduces the cost of the valve assembly with respect to other integral height leveling valves.

The present invention therefore provides a damper assembly with a compact integral height leveling valve which maximizes heat dissipation, and is cost effective.

The present invention could also be part of an air spring assembly in which no shock absorber is involved or could be used separate from an air spring, air spring shock module or shock absorber as a separate height leveling valve attached between a fixed suspension member and a suspension member that telescopes relative to the fixed member.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3A' is an exploded partial sectional view of the integral height leveling valve of FIG. 3A;

FIG. 3B' is an exploded partial sectional view of the integral height leveling valve of FIG. 3B;

FIG. 3C' is an exploded partial sectional view of the integral height leveling valve of FIG. 3C;

DESCRIPTION OF THE PREFERRED EMBODIMENTS

Figure 1A:
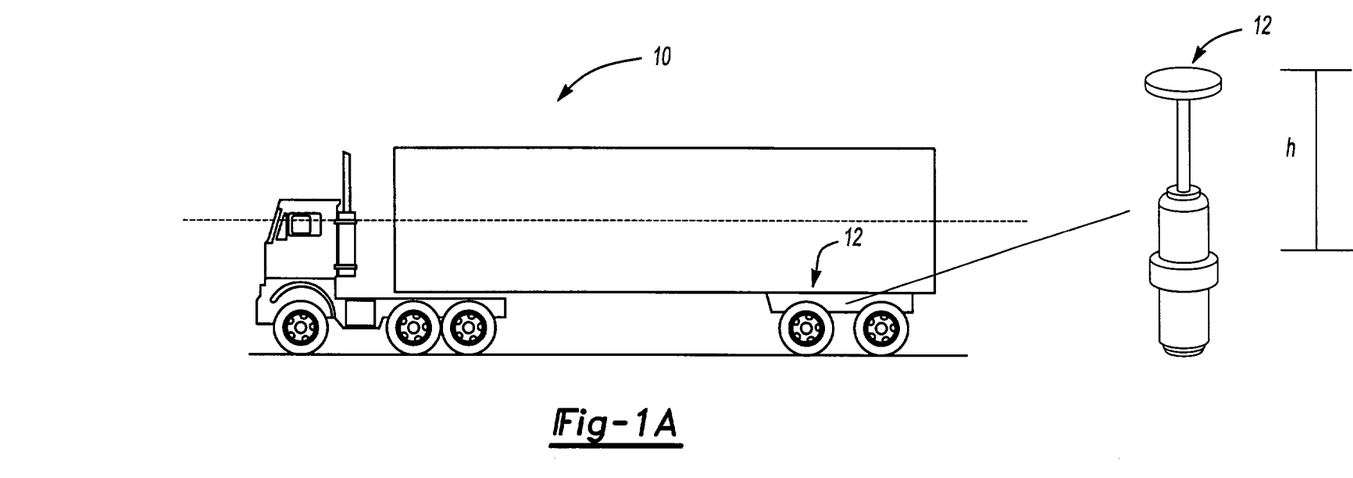
FIG. 1A is a side view of a vehicle having an air spring suspension adjusted to a predetermined height.
Figure 1B:
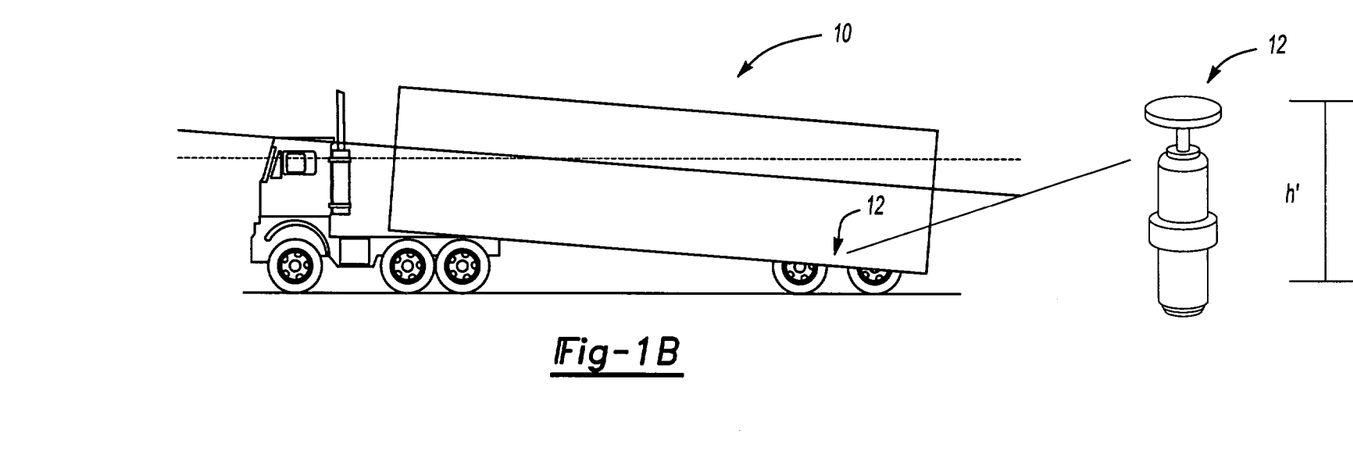
FIG. 1B is a side view of the vehicle of FIG. 1A wherein the air spring suspension is not adjusted to the predetermined height.

Referring to the Figures, a vehicle 10 having an air spring suspension 12 is shown in FIGS. 1A and 1B. In FIG. 1A, the suspension is adjusted to a predetermined height h, wherein the fluid pressure within the suspension 12 falls within an acceptable range such that the vehicle 10 is relatively level. In FIG. 1B, the vehicle is in a loaded condition, which can occur, for example, if an unevenly distributed load is placed on the vehicle 10. When this occurs, the suspension 12 falls below the acceptable range and the vehicle 10 is not level. A height leveling valve functions to bring the vehicle 10 level once again by adding fluid pressure within the suspension 12 to return the suspension 12 to the predetermined height h. Similarly, if load is removed from a vehicle 10, the suspension 12 would rise above the acceptable level and the height leveling valve will release fluid pressure from the air spring suspension 12 to bring the vehicle 10 level once again.

Figure 2:
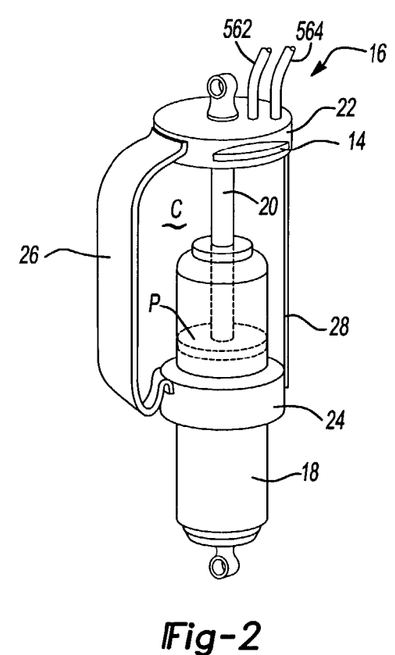
FIG. 2 is a perspective view of the present invention wherein an integral height leveling valve is housed within the upper end of an air spring shock module.

FIG. 2 is a perspective view of the present invention in which a height leveling valve 14 (shown schematically in FIG. 2 and in detail in FIG. 3A') is incorporated into the upper end of a damper such as an air spring shock module 16. It should be understood that the term "damper" as utilized herein should be broadly construed to include air bags, shock absorbers, air springs, air spring shock modules and the like. A fluid cylinder 18 contains a piston p as generally known in the art. A piston rod 20 extends from the fluid cylinder 18 into a first housing 22, which is also the upper end of the air spring shock module 16. A second housing 24 surrounds the fluid cylinder 18. The second housing 24 is preferably a slip on component. An air bag (partially illustrated at 26) is attached to the first housing 22 and the second housing 24 to create an air chamber c as known in the art. Inlet and exhaust air lines 562, 564 attach to the first housing 22.

Figure 3A:
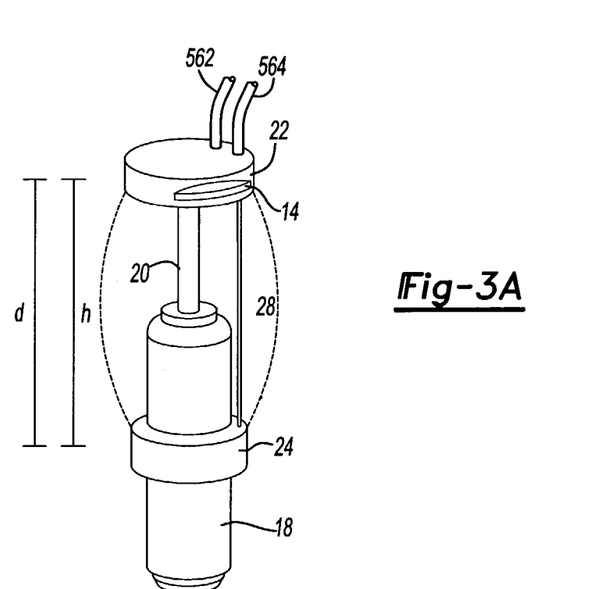
FIG. 3A is an perspective view of a damper assembly at a desired height.

An actuating member 28 is connected to the valve 14. The actuating member 28 is preferably flexible such as a cable, wire, rope or other member which can be wrapped around a rotating cam 30 (FIG. 3A'). The height leveling valve 14 is preferably contained within the first housing 22. The actuating member 28 extends from the first housing 22 and is fixed to the second housing 24. When the vehicle is at ride height, corresponding to a specific distance between the first and second housings, the actuating member 28 allows the valve 14 to be closed and to neither add nor remove air from the vehicle air suspension to adjust vehicle height.

In a preferred embodiment it may be desirable to be able to compensate for manufacturing tolerances in the damper assembly or vehicle air suspension by being able to adjust the unwound length of the actuating member 28 at the condition when the valve 14 is closed. Making fine adjustments to the actuating member 28 unwound length at this valve 14 closed condition makes fine adjustments to the ride height of the air suspension for a particular vehicle. In a preferred embodiment this may be done by an adjusting screw at the point of attachment of the actuating member 28 to the second housing 24. However any means of making fine adjustments to the unwound length of actuating member 28 may be used in the first or second housing.

FIG. 3A' is an exploded partial sectional view of the integral height leveling valve 14. The actuating member 28 is attached to the rotating cam 30. Preferably, the actuating member 28 winds around a spool portion 560 connected to the cam 30 such that changes in the unwound length of the actuating member 28 allow rotation of the cam 30 about axis C in one direction or the other. A sliding valve plate 32 sits adjacent the rotating cam 30, while a return spring 34 biases the sliding valve plate 32 toward the cam 30 such that rotation of the cam 30 linearly displaces the sliding valve plate 32 as shown by the double-headed arrow in FIG. 3A'.

The sliding valve plate 32 includes an inlet flow path 36 and an exhaust flow path 38. There is a corresponding inlet flow path 566 and exhaust flow path 568 in the first housing 22. In a preferred embodiment, the flow paths 566, 568 contain inlet and exhaust port valves 40, 41 with inlet and exhaust port valve pre-load springs 42, 43 to seal the flow paths 566, 568 against the sliding valve plate 32 when they are not aligned with flow paths 36, 38. The port valves 40, 41 outside diameters may be sealed to the first or second housing counter-bores they are contained in by use of a dynamic seal S''' such as an o-ring. However, any method of sealing the flow paths 566, 568 to the sliding valve plate 32 may be utilized.

Some portion of the housing 22 flow paths 566, 568 or their associated port valves 40, 41 or the flow paths 36, 38 in the sliding valve plate 32 is reduced in size to ensure only steady state changes in distance d (FIGS. 3B, 3C) allow any significant air flow/pressure change in the air spring suspension such as, for example, when an unevenly placed load is added or load removed. Having a point of air flow restriction ensures that a transitional change in distance d (FIG. 3B) such as when the vehicle goes over a bump cannot effect significant air flow/pressure changes in chamber c (FIG. 2) since a significant amount of air cannot pass through the valve 14 in such a short time interval.

If, as described above, the valve 14 is used within the housing 22, then the sliding valve plate 32 further includes an opening 44 to receive a retaining pin 46 that connects into housing 22. The valve 14 is at a radial offset to one side from the center of the first housing 22 away from the central location where the piston rod 20 attaches to the first housing 22.

An inlet air line 562 complete with fitting connects with inlet flow path 566 in the housing 22 to convey air pressure from the vehicle supply source into the air spring shock module and in a preferred embodiment an exhaust air line 564, which may include a muffler to reduce exhaust air flow noise, connects with exhaust flow path 568 in the housing 22 to convey exhaust air flow out to the environment. Alternatively, the exhaust flow path 568 may exit directly to the environment with the exhaust flow path 568 sized near its exit from the housing 22 to the environment so as to reduce noise as the exhaust air flow leaves the valve 14. A moveable cover such as a flap may be used at the exit of the exhaust flow path 568 to the environment to prevent the entrance of contamination into the valve 14.

The air spring shock module 16 containing the valve 14 may be connected to one or more air spring shock modules or air springs mounted on the same air suspension but not having height leveling valves of their own. In this way, the valve 14 may control the pressure of all the air spring shock modules or air springs on the air suspension to maintain the vehicle at the predetermined height h (FIG. 1A). The air pressure inside chamber c (FIG. 2) of the air spring shock module 16 can be communicated to the other air spring shock modules or air springs on the same air suspension through air lines emerging from housing 22 where the valve 14 is housed or alternatively air lines emerging from housing 24.

When the distance d between the first and second housing 22, 24 is at a predetermined range h (FIG. 3A), the actuating member 28 locates the cam 30 at a rotational position which linearly locates the valve plate 32 such that both inlet and exhaust flow paths are closed. That is, the current pressure within the air bag 26 (FIG. 2) is maintained. The torsion spring 48 preferably maintains the actuating member 28 in tension. The predetermined range h is the vehicle ride height position.

When the distance d falls out of the range h (FIGS. 3B and 3C), the actuating member 28 extends or retracts around a spool portion 560 which is connected to the cam 30 against the torsion spring 48 tension to open the necessary flow path to regulate the fluid pressure.

Figure 3B:
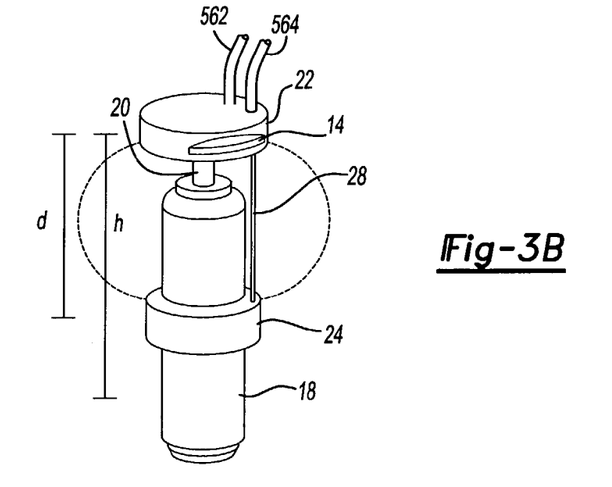
FIG. 3B is an perspective view of a damper assembly at a height below a desired height.

Initially, the distance d is approximately equal to the height h, as shown in FIG. 3A. The damper height increases or decreases in response to a load on the vehicle 10, thus increasing or decreasing the distance d between the first housing 22 and the second housing 24. If the distance d is less than height h (FIG. 3B), this indicates fluid pressure must be added to the air spring suspension to regain height h with the increased load on the suspension. In this case, as shown in FIG. 3B', the actuating member 28 allows the torsion spring 48 to rotate the cam 30 to retract the actuating member 28 around the spool portion 560 and to move the sliding valve plate 32 to align the inlet flow paths 36 and 566, thereby allowing fluid to pass through the center of the port valve 40 to enter the air spring to regulate the vehicle height (distance d).

Figure 3C:
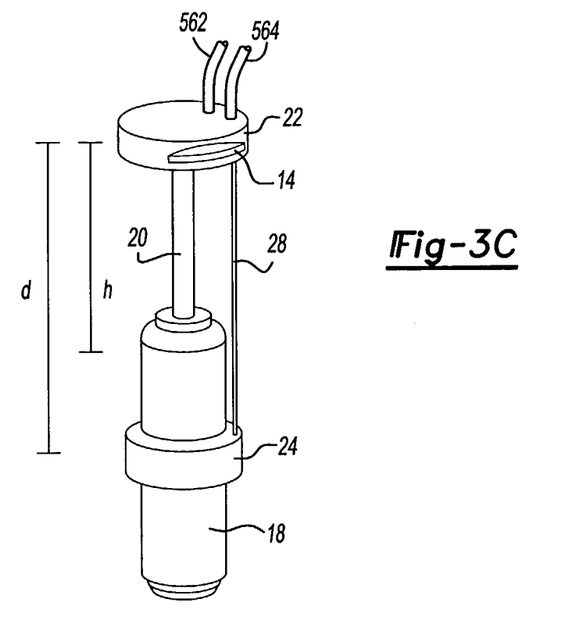
FIG. 3C is an perspective view of a damper assembly at a height above a desired height.

If for example, load is removed from the vehicle, then the distance d increases beyond height h as shown in FIG. 3C, which indicates the fluid pressure is now too high for the given load on the vehicle. When this distance d increases above height h (FIG. 3C), the actuating member 28 rotates the cam 30 in the opposite direction against the torsion spring 48 tension to extend the actuating member 28 from around the spool portion 560 and to move the sliding valve plate 32 to align the exhaust flow paths 38 and 568, allowing fluid to pass through the center of the port valve 41 to exit the assembly as shown in FIG. 3C' to regulate the vehicle height (distance d). In each case, as the distance d between the first housing 22 and the second housing 24 becomes substantially equally to h once again, the actuating member 28 also returns to a predetermined unwound length, which allows the cam 30 to rotate, and the biased sliding valve plate 32 to move, so that both flow paths 566, 568 are once again closed (FIG. 3A').

Figure 4:
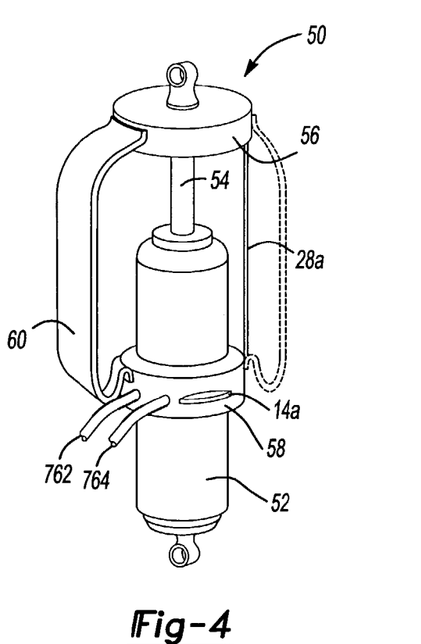
FIG. 4 is a perspective view of the present invention wherein the integral height leveling valve of FIG. 2 is housed within the lower end of an air spring shock module.

The valve 14a may also be incorporated into the lower end of an air spring shock module 50, as shown in FIG. 4. A piston rod 54 extends from the cylinder 52 into a first housing 56. A second housing 58 surrounds the cylinder 52.

An air bag 60 is attached to the first housing 56 and the second housing 58 to create an air chamber. The height leveling valve 14a in this embodiment 50 is contained in the second housing 58. The actuating member 28a is connected to the cam (FIG. 3A') within the second housing 58 and fixedly connected to the first housing 56. Inlet and exhaust air lines 762, 764 attach to the second housing 58.

A benefit of having the valve located in the second housing when the valve is controlling the ride height of a truck cabin air spring suspension is easier routing of air lines to the valve and the avoidance of continual air line flexing during cabin suspension movements as would occur if the valve was contained in the first housing. This benefit results from inlet supply and exhaust air lines typically being routed on the truck frame which is also the attachment point for the lower end of the air spring shock module. The upper end of the air spring shock module would typically connect to the cabin floor.

Figure 5:
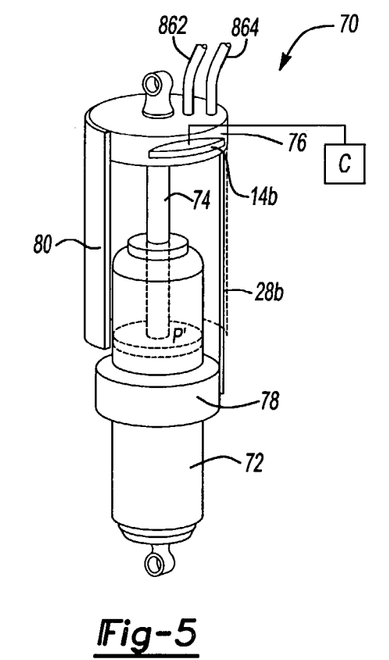
FIG. 5 is a perspective view of the present invention, wherein the integral height leveling valve of FIG. 2 is housed within the upper housing of a shock absorber.

FIG. 5 shows a perspective view of the present invention in which the height leveling valve 14b is incorporated into a shock absorber 70. A cylinder 72 contains a piston p' as known in the art. A piston rod 74 extends from the cylinder 72 into a first housing 76. A second housing 78 surrounds the cylinder 72. In a preferred embodiment a dust tube (partially shown at 80) is attached to the first housing 76 to prevent dust from collecting on the rod 74. However any method of keeping dust off the rod 74 may be used. The height leveling valve 14b is contained within the first housing 76. The actuating member 28b, which is connected to the cam (FIG. 3A') within the first housing 76, extends from the first housing 76 and is fixedly connected to the second housing 78. Inlet and exhaust air lines 862, 864 attach to the first housing 76.

When incorporating the valve 14b into a shock absorber 70 FIG. 5), there is no air bag to form a chamber c (FIG. 2) and seal the pressurized air in the valve from ambient air. It is preferred to add a seal S (FIG. 3A') within the first housing to seal on the outside diameter of the spool portion 560 at its juncture with the cam 30. This leaves the spool portion 560 and the actuating member 28 at ambient pressure with all other parts of the valve 14b sealed and able to maintain elevated pressures. While a seal such as an O-ring is preferred, any suitable seal may benefit the present invention.

When used in a shock absorber, the valve assembly 14b operates to maintain vehicle height through the maintenance of air pressure in a separate air spring in a manner similar to, for example, that described in FIGS. 3A', 3B' and 3C'. It should be understood that multiple air springs or the like may be controlled remotely by a single valve assembly on a single shock absorber or other member. That is, the one valve assembly on a single air spring member or the like also controls a plurality of air spring members or the like.

The valve 14b however alternatively or additionally is used to measure the distance d between the housings 76, 78 and then utilize this information to remotely control a variety of remote devices such as an air spring or another device. The linear measurement taken from the sliding valve plate or a rotational measurement from the cam is sent to a controller (FIG. 5) and utilized for a variety of applications, i.e. sending distance d to a remote air spring or other device.

Figure 6:
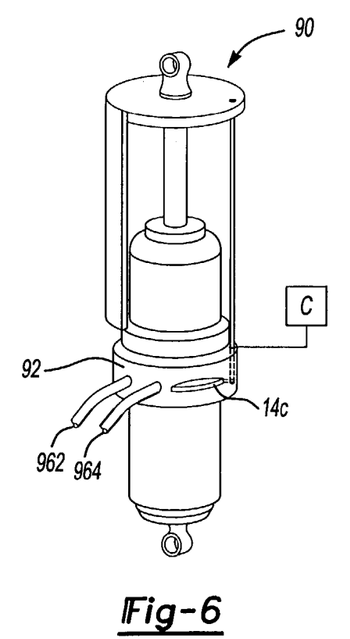
FIG. 6 is a perspective view of the present invention, wherein the integral height leveling valve of FIG. 2 is housed within the lower housing of a shock absorber.

FIG. 6 shows another perspective view of the present invention, in which the height leveling valve 14c is incorporated into another shock absorber 90. The height leveling valve 14c is contained within the second housing 92 as described with respect to FIG. 5. Inlet and exhaust air lines 962, 964 attach to the second housing 92.

Figure 7A:
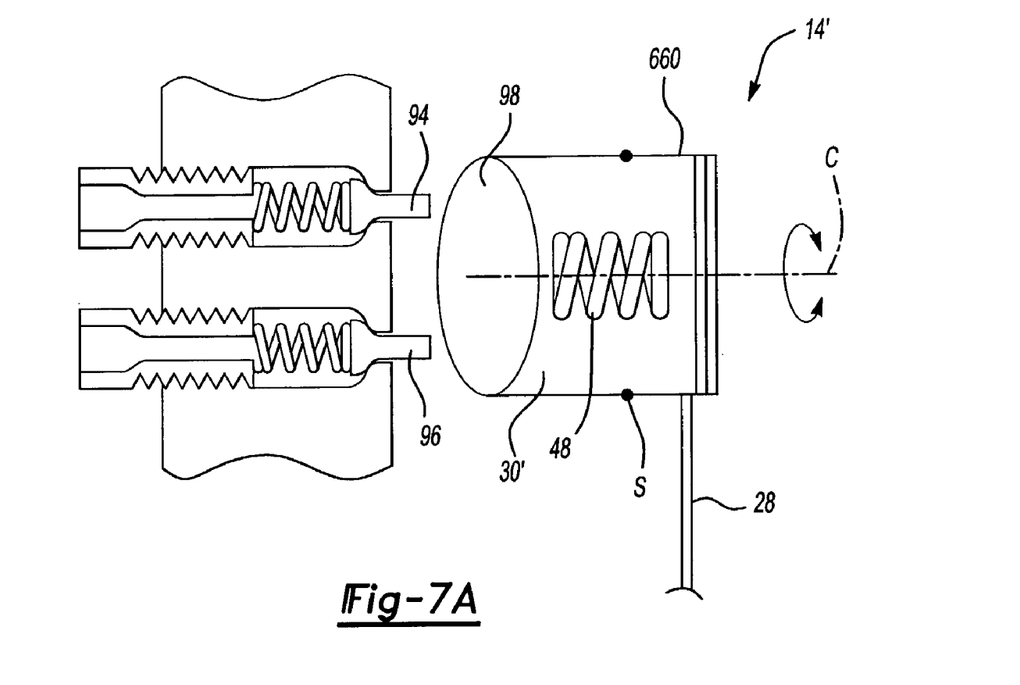
FIG. 7A is another integral height leveling valve where inlet and exhaust valves are directly actuated by a cam in an axial direction according to the present invention.

Referring to FIG. 7A, another integral height leveling valve 14' includes a rotating cam 30' which directly engages an inlet spring biased valve 94 and an exhaust spring biased valve 96. The valves 94, 96 are located in an axial direction relative to the rotating cam 30'. The rotating cam 30' rotates about a cam axis C. The valves 94, 96 may alternatively or additionally include poppet, ball or other valves which are selectively opened by overcoming a spring or other bias. Alternately a single spool valve may be directly activated by the rotating cam 30' and used in place of separate inlet and exhaust valves.

Figure 7B:
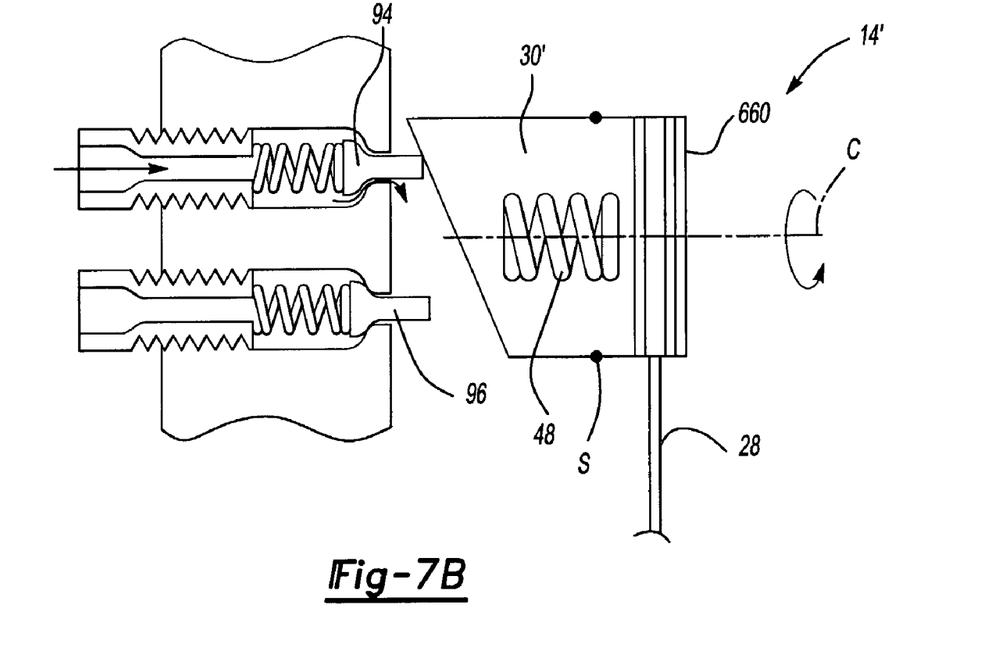
FIG. 7B is the integral height leveling valve of FIG. 7A in an inlet open condition.
Figure 7C:
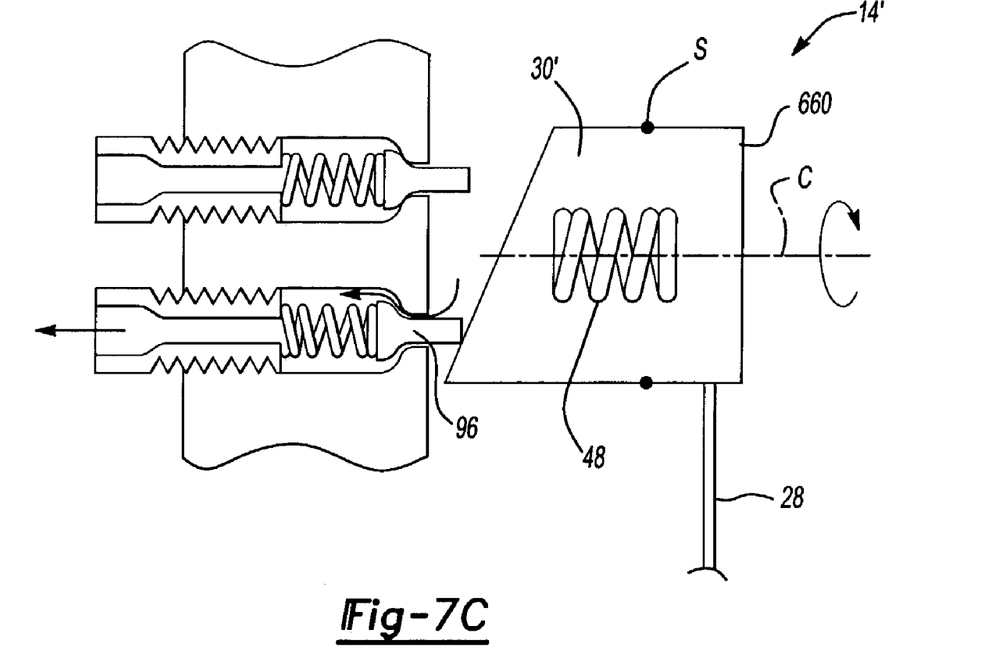
FIG. 7C is the integral height leveling valve of FIG. 7A in an exhaust open condition.
Figure 8:
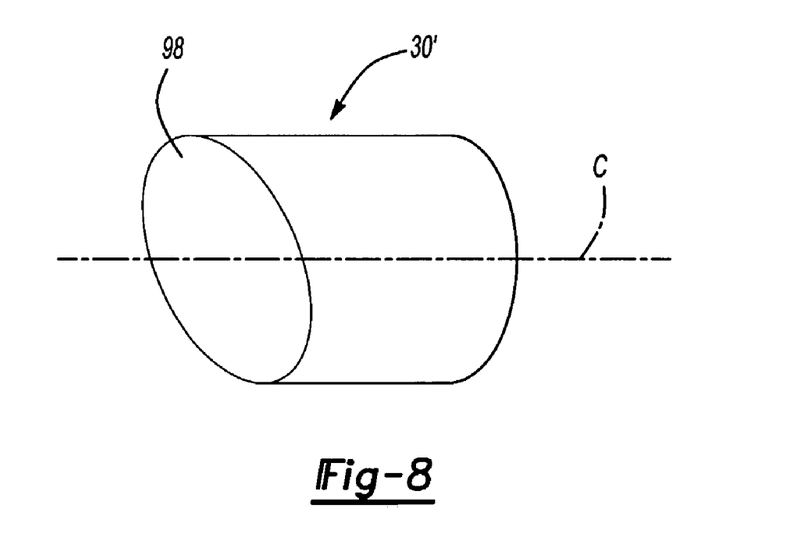
FIG. 8 is a perspective view of the cam member.

The rotating cam 30' includes an inclined surface 98 (FIG. 8) which does not engage the inlet spring biased valve 94 and the exhaust spring biased valve 96 when the vehicle is at the desired height h (FIG. 1A). Both the inlet spring biased valve 94 and the exhaust spring biased valve 96 are closed (FIG. 7A). When the distance d falls out of the range h (FIGS. 7B and 7C), the actuating member 28 retracts around or extends from around the spool portion 660 connected to the cam 30' against the torsion spring 48 tension. When the distance d is less than the desired height h, the cam profile, which is inclined surface 98 (FIG. 8) and which activates the valves in a direction parallel to the cam axis C, engages and opens the inlet spring biased valve 94 (FIG. 7B) to increase air pressure in the air spring suspension and increase the vehicle height toward the desired height h. When the distance d is greater than the desired height h, the inclined surface 98 engages and opens the exhaust spring biased valve 96 (FIG. 7C) to release air pressure and decrease the vehicle height toward the desired height h.

Figures 9, 10:
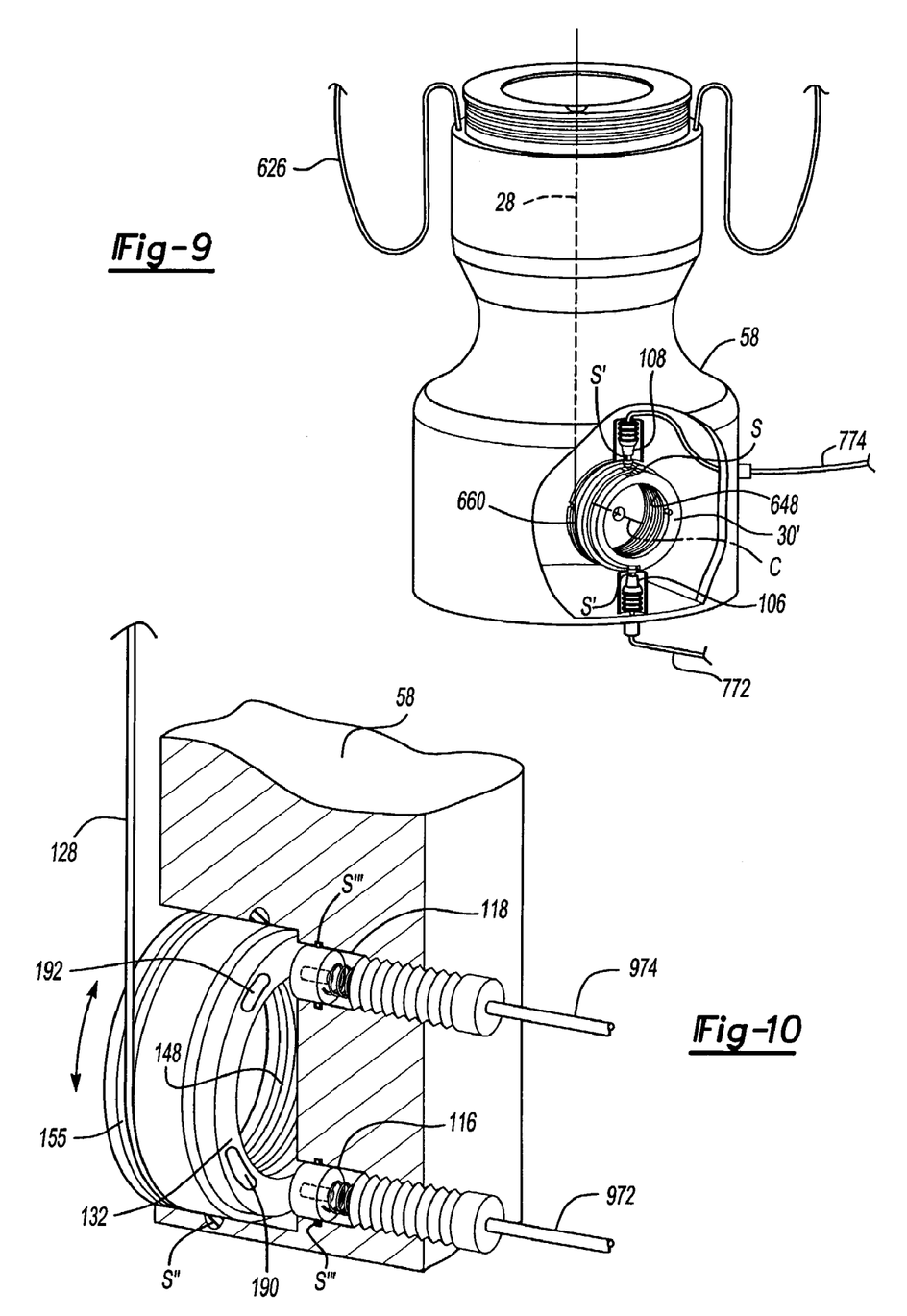
FIG. 9 is another integral height leveling valve where inlet and exhaust valves are directly actuated by a cam in a radial direction according to the present invention.
FIG. 10 is another integral height leveling valve where a rotating valve plate has axial port valves according to the present invention.

An example of a height leveling valve in the second housing 58 onto which the lower end of an air bag 626 is attached similar to that shown in FIG. 4 is shown in FIG. 9. The rotating cam 30' is controlled by actuating member 28 which wraps around a spool portion 660 connected to the cam 30'. The actuating member 28 is kept in tension by torsion spring 648 acting on cam 30' and connected spool portion 660. The rotating cam 30' radial profile controllably activates inlet spring biased valve 106 and exhaust spring biased valve 108 placed in a radial direction about the cam axis C to control vehicle height depending upon the vehicle loading. The height leveling valve is shown in FIG. 9 with the air spring shock module at full extension resulting in the exhaust valve 108 being open to release air pressure from the air bag 626 to return the air suspension to ride height. Also as shown in FIG. 9 an inlet air line 772 and an exhaust air line 774 are connected to flow passages through the inlet spring biased valve 106 and exhaust spring biased valve 108 respectively at their exits from the lower housing wall.

When the height leveling valve (FIGS. 7A, 7B, 7C, 9) is used in a shock absorber and no air bag is present (FIGS. 5, 6), in a preferred embodiment a seal S is placed in the first or second housing to contact the spool portion 660 outside diameter at its juncture with the cam 30' to contain pressurized air within the valve. The actuating member 28 and spool portion 660 will be at ambient pressure. In another embodiment the actuating member 28, spool portion 660 and cam 30' are at ambient pressure where the directly actuated valves 106, 108 (FIG. 9) contain seals S' to isolate the air pressure they control from the ambient.

In FIG. 10 the actuating member 128 controls the movement of a rotating valve plate 132. The inlet spring pre-loaded port valve 116 and exhaust spring pre-loaded port valve 118, shown for example as in the housing 58 (similar to that in FIG. 4), seal axially against the rotating valve plate 132. Dynamic seals S''' such as o'rings can be used to seal the port valves to the housing. When the vehicle is at the desired height h, the rotating valve plate 132 is rotationally aligned so that the inlet port valve 116 and the exhaust port valve 118 are in contact with a portion of the valve plate that contains no air flow openings. The air flow openings are preferably arcuate slot-like openings 190, 192 through the rotating valve plate 132. If the vehicle height falls below the desired level the actuating member 128 allows the torsion spring 148 to rotate the spool portion 155 and connected rotating valve plate 132 to retract the actuating member 128 around the spool portion 155 and to align the flow passage through the inlet port valve 116 with an inlet flow passage 190 in the rotating valve plate 132 to allow inlet air flow. If the vehicle rises above the desired height the actuating member 128 rotates the spool portion 155 and connected rotating valve plate 132 against the torsion spring 148 tension to extend the actuating member 128 and align the flow passage through the exhaust port valve 118 with an exhaust flow passage 192 in the valve plate to allow exhaust air flow. An inlet air line 972 and an exhaust air line 974 are connected to the inlet port valve 116 and exhaust port valve 118 respectively at the points where they exit from the housing.

Figure 11:
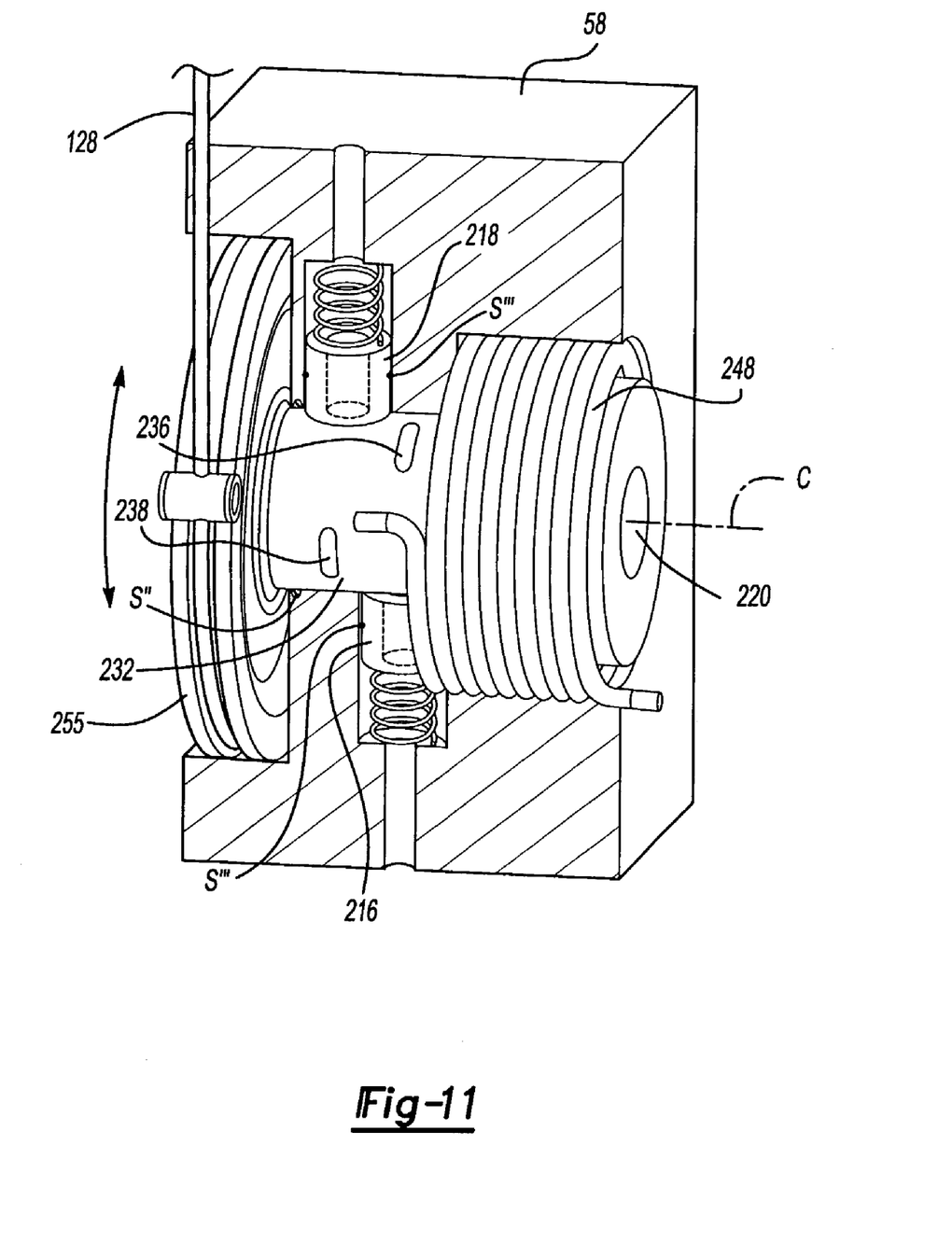
FIG. 11 is another integral height leveling valve where a rotating valve has radial port valves according to the present invention.

In FIG. 11, another arrangement includes an inlet spring pre-loaded port valve 216 and an exhaust spring pre-loaded port valve 218, shown for example as in the housing 58 (similar to that in FIG. 4), having a radial spacing about the rotary valve axis C and which seal against the rotary valve 232 outside diameter surface. Seals S''' such as o'rings can be used to seal the port valves to the housing. The changing unwound lengths of the actuating member 128 cause the interlocked spool 255 and rotary valve 232 to rotate against the torsion spring 248 tension to increase or decrease the air spring suspension air pressure to maintain desired vehicle height by aligning the inlet flow path 236 or exhaust flow path 238 in the rotary valve with the corresponding flow path through the inlet port valve 216 or exhaust port valve 218. The air flow passing through port valves 216, 218 into or from flow paths 236, 238 on the rotating valve 232 outside diameter surface is carried into or out of the air spring by passing between the rotating valve 232 outside diameter surface and the corresponding bore in housing 58 or through a hollow center 220 of the rotating valve 232. Inlet and exhaust air lines are connected to inlet and exhaust flow paths through port valves 216, 218 where they exit the housing.

Isolating air pressure inside the height leveling valve (FIG. 10) from ambient pressure for shock absorber applications (FIGS. 5, 6) where no air bag is present can be accomplished by a seal S'' in the first or second housing that seals against the spool portion 155 outside diameter at its juncture with the rotating valve plate 132 (FIG. 10). Similarly, the height leveling valve of FIG. 11 can use a seal S'' against the rotating valve 232 outside diameter at its juncture with the spool 255.

The height leveling valve as previously described can also be used separate from dampers consisting of air bags, shock absorbers, air springs or air spring shock modules and can be mounted between a fixed suspension member and a member of the suspension that telescopes relative to the fixed member to control an air suspension height.

Numerous changes may be made within the scope of the present invention. For example, the mechanisms may be adapted such that an increase in d indicates high fluid pressure. It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A damper assembly comprising:
   a first housing mounted to piston rod;
   a second housing mounted to a fluid cylinder which receives said piston rod, said second housing movable relative to said first housing and with movement of said piston rod relative to said fluid cylinder;
   a height leveling valve mounted within said second housing;
   a flexible actuating member formed of a flexible material connected between said height leveling valve and said first housing; and
   a rotating valve attached to said flexible actuating member, said flexible actuating member at least partially wound around said rotating valve.

2. The damper assembly as recited in claim 1, further comprising a radial inlet flow path and a radial exhaust flow path through said rotating valve, said rotating valve selectively scaling said radial inlet and radial exhaust flow paths as said rotating valve rotates.

3. The damper assembly as recited in claim 1, further comprising a torsion spring housed on said rotating valve, said torsion spring maintaining said flexible actuating member attached to said rotating valve in tension.

4. A damper assembly comprising:
   a first housing mounted to a piston rod;
   a second housing mounted to a fluid cylinder which receives said piston rod, said second housing movable relative to said first housing as said piston rod moves relative said fluid cylinder; and
   a flexible actuating member at least partially wound around a rotating valve and connected to said first housing such that said rotating valve rotates in response to movement of said second housing relative to said first housing to control a distance between said first housing and said second housing.

5. The damper assembly as recited in claim 4, wherein said flexible actuating member includes a cable.

6. The damper assembly as recited in claim 4, wherein said rotating valve defines an inlet flow path and an exhaust flow path.

7. A method of regulating the height of a damper assembly comprising the steps of:
   1) connecting a flexible actuating member between a rotating valve and a first housing mounted to a piston rod which extends from a fluid cylinder of the damper assembly such that the rotating valve rotates in response to relative movement between the fluid cylinder and the piston rod which extends from said fluid cylinder; and
   2) rotating the rotating valve with the flexible actuating member in response to relative movement between the fluid cylinder and the piston rod such that rotation of the rotating valve opens a radial flow passage relative the rotating valve to adjust the height of the damper assembly toward a desired predetermined height.

8. The method as recited in claim 7 wherein said step 2) further comprises rotating the rotating valve to open a radial inlet flow path when a height of the telescoping member is less than the desired predetermined height.

9. The method as recited in claim 7 wherein said step 2) further comprises rotating the rotating valve to open a radial exhaust flow path when a height of the telescoping member is greater than the desired predetermined height.

10. The method as recited in claim 7 wherein said step 1) further comprise the step of:
    maintaining the flexible actuating member in tension.

11. The method as recited in claim 7 wherein said step 1) further comprise the step of:
    winding the flexible actuating member at least partially around the rotating valve.

12. The damper assembly as recited in claim 6, wherein said inlet flow path and said exhaust flow path intersect an outer diameter surface of said rotating valve and communicate through a hollow center of said rotating valve.

13. The damper assembly as recited in claim 6, wherein said inlet flow path and said exhaust flow path intersect an outer diameter of said rotating valve and communicate through a space between said outer diameter surface and a bore in said first housing.

14. A damper assembly comprising
    a first housing mounted to piston rod;
    a second housing mounted to a fluid cylinder which receives said piston rod, said second housing movable relative to said first housing and with movement of said piston rod relative to said fluid cylinder;
    a height leveling valve mounted within said second housing;
    a flexible actuating member formed of a flexible material connected between said height leveling valve and said first housing; and
    said flexible actuating member includes a cable.

15. The damper assembly as recited in claim 14, wherein said second housing is mounted at least partially around said fluid cylinder.

* * * * *

UNITED STATES PATENT AND TRADEMARK OFFICE
CERTIFICATE OF CORRECTION

| | |
|---|---|
| PATENT NO. | : 7,150,450 B2 |
| APPLICATION NO. | : 10/453966 |
| DATED | : December 19, 2006 |
| INVENTOR(S) | : Bell et al. |

It is certified that error appears in the above-identified patent and that said Letters Patent is hereby corrected as shown below:

Column 9, line 21: "scaling" should be --sealing--

Signed and Sealed this

Twentieth Day of March, 2007

JON W. DUDAS
*Director of the United States Patent and Trademark Office*